(12) United States Patent
Traut et al.

(10) Patent No.: US 8,495,621 B2
(45) Date of Patent: Jul. 23, 2013

(54) CATALOG-BASED SOFTWARE COMPONENT MANAGEMENT

(75) Inventors: Eric P. Traut, Bellevue, WA (US); Darryl E. Havens, Kirland, WA (US); Jose Manuel Bernabeu-Auban, Sammamish, WA (US); Mark R. Brown, Seattle, WA (US); Richard B. Ward, Redmond, WA (US); Suyash Sinha, Snohomish, WA (US); Tahsin Erdogan, Redmond, WA (US); Adam D. Stritzel, Redmond, WA (US); Adriaan W. Canter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 913 days.

(21) Appl. No.: 12/484,394

(22) Filed: Jun. 15, 2009

(65) Prior Publication Data
US 2010/0318968 A1   Dec. 16, 2010

(51) Int. Cl.
*G06F 9/445* (2006.01)
*G06F 9/44* (2006.01)
*G06F 17/00* (2006.01)

(52) U.S. Cl.
USPC .............................. 717/174; 717/170; 463/42

(58) Field of Classification Search
USPC .................................................. 717/101–178
See application file for complete search history.

(56) References Cited

U.S. PATENT DOCUMENTS

| | | | | |
|---|---|---|---|---|
| 4,558,413 A | * | 12/1985 | Schmidt et al. | 717/170 |
| 6,397,378 B1 | * | 5/2002 | Grey et al. | 717/175 |
| 7,191,436 B1 | * | 3/2007 | Durr et al. | 717/170 |
| 7,305,669 B2 | * | 12/2007 | Roush | 717/170 |
| 7,546,595 B1 | * | 6/2009 | Wickham et al. | 717/168 |
| 7,574,706 B2 | * | 8/2009 | Meulemans et al. | 717/174 |
| 2003/0181242 A1 | * | 9/2003 | Lee et al. | 463/42 |
| 2004/0093593 A1 | | 5/2004 | Jhanwar et al. | |
| 2004/0093595 A1 | * | 5/2004 | Bilange | 717/171 |
| 2005/0091192 A1 | * | 4/2005 | Probert et al. | 707/1 |
| 2005/0132349 A1 | * | 6/2005 | Roberts et al. | 717/168 |
| 2006/0184932 A1 | * | 8/2006 | Burnley et al. | 717/174 |
| 2006/0253849 A1 | * | 11/2006 | Avram et al. | 717/172 |
| 2007/0061799 A1 | | 3/2007 | Kimmerly | |

(Continued)

OTHER PUBLICATIONS

Sonnenberger, Jorg, "The redesign of pkg install for pkgsrc", retrieved at <<http://www.netbsd.org/gallery/presentations/joerg/eurobsdcon2006/pkg_install.pdf>>, Oct. 15, 2006, pp. 1-12.

(Continued)

*Primary Examiner* — Don Wong
*Assistant Examiner* — Mohammad Kabir
(74) *Attorney, Agent, or Firm* — Wolfe-SBMC

(57) ABSTRACT

Multiple software component identifiers are maintained in a catalog of an operating system running on a device. Each of these software component identifiers corresponds to one of multiple software components installed on the device. The catalog is accessed in response to a request regarding one of the multiple software components, and the request is responded to based at least in part on information included in the catalog. Additionally, two or more versions of a software component that are installed on the computing device can be identified. Which one of the two or more versions of the software component is an active version of the software component to be run is determined. In response to requests for information regarding the software component, information regarding the active version of the software component is returned.

20 Claims, 6 Drawing Sheets

U.S. PATENT DOCUMENTS

| | | | |
|---|---|---|---|
| 2007/0150587 A1* | 6/2007 | D'Alo et al. | 709/224 |
| 2007/0168957 A1* | 7/2007 | Li et al. | 717/120 |
| 2007/0220507 A1* | 9/2007 | Back et al. | 717/170 |
| 2007/0260653 A1 | 11/2007 | Jaffri et al. | |
| 2008/0134162 A1* | 6/2008 | James et al. | 717/168 |
| 2009/0024984 A1* | 1/2009 | Maeda | 717/121 |
| 2009/0055809 A1 | 2/2009 | Campbell | |

OTHER PUBLICATIONS

"Creating a Software Component in the SLD", retrieved at <<http://help.sap.com/saphelp_nwce711/helpdata/en/d4/8d784289b4de54e10000000a155106/content.htm>>, Apr. 2, 2009, pp. 2.

Mikic-Rakic, et al., "Architecture-Level Support for Software Component Deployment in Resource Constrained Environments", retrieved at <<http://sunset.usc.edu/~softarch/Prism/publications/Deployment.pdf>>, pp. 15.

"International Search Report", Mailed Date: Dec. 30, 2010, Application No. PCT/US2010/038590, Filed Date: Jun. 15, 2010, pp. 8.

Mikic-Rakin, Marija et al., "Architecture-Level Support for Software Component Deployment in Resource Constrained Environments", *Lecture Notes In Computer Science*, vol. 2370, Available at <http://sunset.usc.edu/~softarch/Prism/publications/Deployment.pdf>, (2002), 15 Pages.

* cited by examiner

CATALOG-BASED SOFTWARE COMPONENT MANAGEMENT

BACKGROUND

A computer typically runs an operating system that provides various functionality including allowing other applications to be installed and run on the computer. Different applications can oftentimes be installed on a computer and run in different manners, resulting in various files and information being stored in numerous locations, folders, and so forth on the computer. Accordingly, managing such different applications on a computer can create numerous difficulties, such as when attempting to upgrade the application to a new version, when uninstalling an application, and so forth.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, multiple software component identifiers are maintained in a catalog of an operating system of a device. Each of these software component identifiers corresponds to one of multiple software components installed on the device. The catalog is accessed in response to a request regarding one of the multiple software components, and the request is responded to based at least in part on information included in the catalog.

In accordance with one or more aspects, in an operating system of a computing device two or more versions of a software component that are installed on the computing device are identified. Which one of the two or more versions of the software component is an active version of the software component to be run is determined. In response to requests for information regarding the software component, information regarding the active version of the software component is returned.

BRIEF DESCRIPTION OF THE DRAWINGS

The same numbers are used throughout the drawings to reference like features.

DETAILED DESCRIPTION

Catalog-based software component management is discussed herein. A software product is made up of one or more software components. Each software component has an identity that is maintained in a catalog of an operating system on a computing device. The catalog identifies which software components are installed on the computing device. The catalog allows the operating system to readily identify software components installed on the system as well as to manage those software components.

Figure 1:
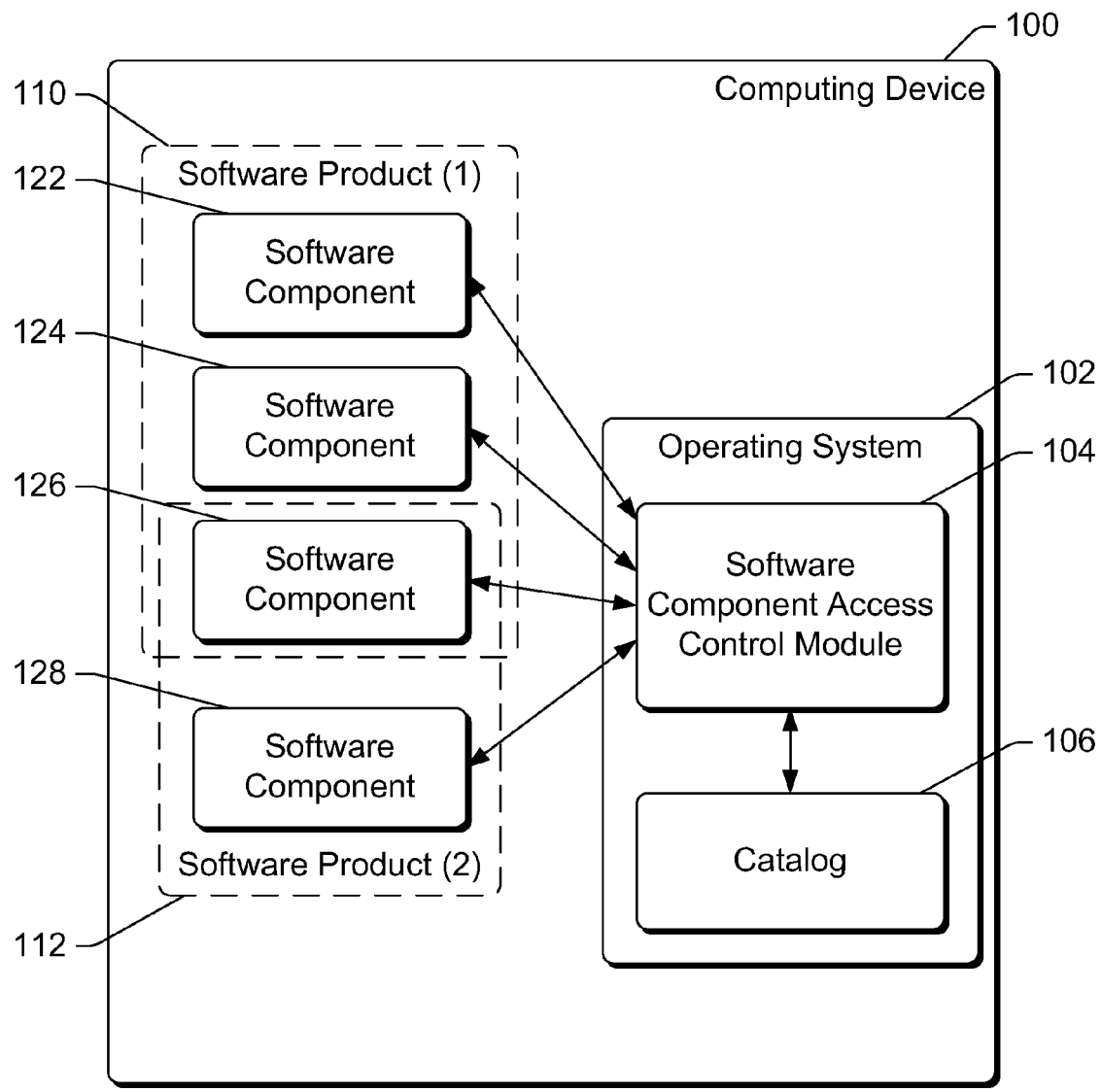
FIG. 1 illustrates an example computing device implementing the catalog-based software component management in accordance with one or more embodiments.

FIG. 1 illustrates an example computing device 100 implementing the catalog-based software component management in accordance with one or more embodiments. Computing device 100 can be a variety of different devices capable of running software applications. For example, computing device 100 can be a desktop computer, a server computer, a laptop computer, a mobile station, an entertainment appliance, a set-top box communicatively coupled to a display device, a cellular or other wireless phone, a game console, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, hand-held game consoles).

Computing device 100 includes an operating system 102 having a software component access control module 104 and a catalog 106. Two software products 110 and 112, also referred to as software applications, are illustrated as being included in computing device 100. Although two software products 110 and 112 are illustrated in the example of FIG. 1, alternatively fewer than two or more than two software products can be included in computing device 100. Each software product 110 and 112 includes one or more software components. In the example of FIG. 1, software product 110 includes software component 122, software component 124, and software component 126, while software product 112 includes software component 126 and software component 128. As can be seen in FIG. 1, multiple different software products can share a software component (e.g., software component 126).

Software component access control module 104 manages the software components installed on computing device 100. Control module 104 maintains as catalog 106 a record of the software components that are installed on computing device 100 (e.g., software components 122-128 in the example of FIG. 1). Catalog 106 is a record of the software components that are installed on and thus can be run on computing device 100. In order to run a software component on computing device 100, that software component is installed on computing device. This installation process is typically performed by an installation component or module, and typically includes storing files in various locations of a file system of operating system 102, storing various information describing the software component, and so forth. As part of the process of installing a software component on computing device 100, control module 104 is made aware of the software component, allowing an identifier of the software component to be added to catalog 106. Such installed software components can also be referred to as "active" software components because the software components can be run on computing device 100.

Other software components may be stored on computing device 100 but not be installed on computing device 100. Operating system 102 is typically not aware of such software components, does not include identifiers of such components in catalog 106, and does not support running such software components. Accordingly, such software components can also be referred to as "dormant" because although they are stored on computing device 100, such software components are not installed on computing device 100. It is to be appreciated that situations can arise where a software component is an executable file that can be executed by operating system 102 even though the executable file has not been installed on computing device 100. However, as such software components are not installed on computing device 100, operating system 102 is typically not aware of information regarding such software components (e.g., the functionality provided by such software components, the developer or publisher of such software components, etc.), and thus such software components are still referred to as dormant software components.

Software component access control module 104 provides centralized management of software components installed on computing device 100. By maintaining catalog 106, control module 104 is aware of and can readily provide various functionality for the specific software components as discussed in more detail below. For example, control module 104 can readily identify all the software components 104 installed on computing device 100, and can provide various functionality with regard to these identified software components.

As can be seen in FIG. 1, each software product is comprised of one or more software components. The software components of a software product include instructions and data that can be run on computing device 100 and together the software components provide the functionality of the software product. Operating system 102 communicates with the individual software components when running, rather than with the software product as a whole.

Although a single catalog 106 is illustrated in FIG. 1, operating system 102 may alternatively include multiple catalogs 106. In one or more embodiments, operating system 102 includes a different catalog 106 for each account on computing device 100. In such embodiments, operating system 102 allows different users to each set up a different account (or multiple different accounts), maintaining different settings, access rights, and so forth for the different accounts. In addition, one or more system or administrator accounts can also be set up on computing device 100. Operating system 102 maintains a different catalog 106 for each of these different accounts. Operating system 102 may also allow multiple different users to be logged in to computing device 100 at any given time. However, in such situations typically only one of the multiple users is a currently active user (using a currently active account). Accordingly, the catalog 106 used by control module 104 at any given time can vary based on the particular account of computing device 100 that is logged into at that given time, and possibly which of multiple accounts logged into is a currently active account at that given time.

A particular catalog 106 includes identifiers of software components that are installed on computing device 100. In situations where different catalogs 106 are maintained for different accounts, a particular catalog 106 includes identifiers of software components that are installed on computing device 100 under that account. Different users can install different software components on computing device 100, resulting in different identifiers being included in different catalogs 106.

Figure 2:
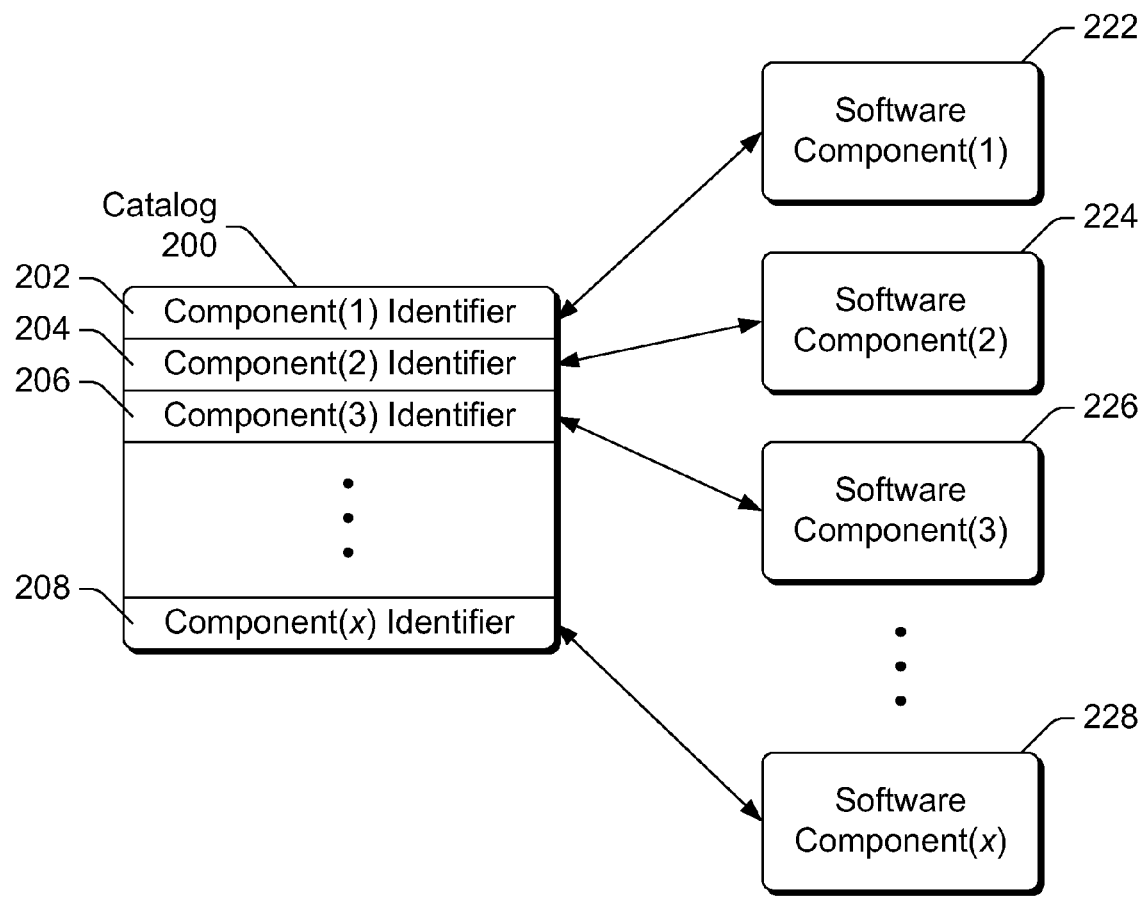
FIG. 2 illustrates an example catalog in accordance with one or more embodiments.

FIG. 2 illustrates an example catalog 200 in accordance with one or more embodiments. Catalog 200 includes multiple software component identifiers 202, 204, 206, and 208, each identifying a corresponding software component 222, 224, 226, and 228, respectively. The software components 222-228 are the software components that are installed on the computing device (or installed under a particular account of the operating system of the computing device) implementing catalog 200.

Each software component 222-228 has a component identity that allows the software component to be distinguished from other software components. In one or more embodiments this identity is provided by the software components, such as being included in a manifest as discussed in more detail below. Alternatively, the component identity can be generated in other manners, such as by the operating system (e.g., operating system 102 of FIG. 1), by another component or module, by another local or remote service, by another local or remote device, and so forth.

Returning to FIG. 1, in one or more embodiments catalog 106 includes a single index of installed software components. In other embodiments, catalog 106 includes multiple indexes or portions of software components. These multiple indexes or portions include, for example, one index or portion that includes all the installed software components installed, which is also referred to as a full index. These multiple indexes or portions can also include, for example, a second index or portion that includes a subset of software components that satisfy a particular set of rules or criteria, which is also referred to as an effective index. This set of rules or criteria can be used to effectively reduce the software components that are installed and can be run.

Typically, the effective index identifies the active versions of software components that are installed on computing device 100. Multiple different versions of a software component can be installed on computing device 100, each of which is included in the full index. However, for multiple versions of a software component, one of those versions is selected for inclusion in the effective index.

A variety of different rules or criteria can be used to determine the versions selected for inclusion in the effective index. In one or more embodiments, one such rule is a versioning rule. A versioning rule specifies which of multiple different versions of a software component is the active version based on a version number or other version identifier. Such a versioning rule can be, for example, that the most recent version is to be run (e.g., the version with the highest version number), that the version having a version identifier in a particular format or having a particular value is to be run, and so forth. In such embodiments, the active version of the software component is included in the effective index and other versions of the software component are excluded from the effective index even though they may be included in the full index.

Another rule that can be used to determine the effective index is a policy rule. A policy can be established by, for example, an administrator of computing device 100 or an administrator of a network to which computing device 100 is coupled for a variety of different reasons. This policy can specify that particular software components or versions thereof are not to be run on computing device 100, that only software components or versions thereof digitally signed by a particular publisher are to be run, and so forth. In such situations, the specified software components or versions thereof are excluded from the effective index even though they may be included in the full index.

Another rule that can be used to determine the effective index is a duplicate rule. A duplicate rule specifies that if multiple copies of the same software component are installed on the computing device, only one such copy is to be maintained in the effective index. Multiple such copies can be installed for a variety of different reasons, such as as a result of multiple software products being installed on the computing device each of which includes a common software component.

Figure 3:
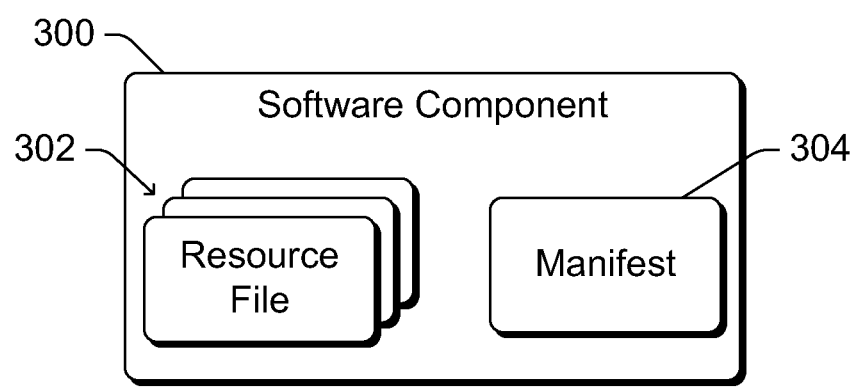
FIG. 3 illustrates an example software component in accordance with one or more embodiments.

FIG. 3 illustrates an example software component 300 in accordance with one or more embodiments. A software component is a collection of both one or more files and metadata that describes the software component. Software component 300 includes one or more resource files 302 each storing various instructions and/or data for the software component 300. The particular resource files 302 that are included in software component 300 can vary based on the desires of the developer of software component 300.

Manifest 304 stores metadata describing software component 300 and the functionality exposed by software component 300. In one or more embodiments, manifest 304 includes an identifier of software component 300. The identifier of software component 300 allows software component 300 to be distinguished from other software components installed on the device. This identifier can be made up of various attributes, such as one or more version numbers of software component 300, a digital signature over resource files 302 (and optionally parts of manifest 304), and an identifier of the publisher or developer of software component 300. Alternatively, these version numbers, digital signature, and identifier of the publisher or developer can be maintained separately instead of (or in addition to) being included as attributes of the identifier of software component 300.

The version number of software component 300 allows different versions of software component 300 to be readily identified. These version numbers can be used to facilitate managing of software component 300 as discussed in more detail below.

Manifest 304 can also include hash values generated by applying a hash function to resource files 302. A variety of different hash functions can be used to generate the hash values, such as one or more cryptographic or one-way hash functions. Examples of such hash functions include the MD5 (Message-Digest algorithm 5) hash function, the SHA-1 (Secure Hash Algorithm 1) hash function, and so forth.

A digital signature over at least a portion of manifest 304 (e.g., those portions of manifest 304 other than the digital signature) is generated by or on behalf of a publisher of software component 300. The digital signature can alternatively also be over resource files 302 (in place of or in addition to hashes of the resource files 302 being included in manifest 304). The publisher of software component 300 can be a developer of resource files 302 of software component 300, or alternatively another entity that distributes software component 300. The digital signature can be generated using any of a variety of well-known techniques based on public key cryptography. The digital signature changes if the resource files 302 (e.g., due to the hash values of the resource files 302 in manifest 304) as well as the other portions of manifest 304 over which the digital signature is made change. Accordingly, the digital signature can also serve as an identifier of a particular set of resource files 302 as well as the other portions of manifest 304 over which the digital signature is made change.

The identity of the publisher and/or developer of software component 300 and can also be included in manifest 304. The digital signature can also be generated over this identity of the publisher and/or developer.

When software component 300 is to be installed on a computing device, such as computing device 100 of FIG. 1, software component 300 is obtained by an installation or deployment component or module. Software component 300 can be obtained from any of a variety of local and/or remote services and/or devices.

As part of the installation process, the identifier of software component 300 is added to the catalog of the particular account of the operating system of the computing device at the time of installation or alternatively as identified by the installation process. The installation process can add the identifier of software component 300 to the catalog, or alternatively can communicate with a software component access control module (e.g., control module 104 of FIG. 1) which in turn can add the identifier of software component 300 to the catalog.

In one or more embodiments, one or more validation actions are taken by a software component access control module or by an installation component or module prior to adding the identifier of software component 300 to the catalog. A variety of different validation actions can be taken. For example, a set of rules or criteria can be established that software component 300, manifest 304, and/or resource files 302 are to conform to. As part of the validation, a check can be made as to whether the set of rules or criteria has in fact been conformed to. If the set of rules or criteria has not been conformed to, then the identifier of software component 300 is not added to the catalog.

By way of another example, a check can be made as to whether a digital signature over resource files 302 and/or manifest 304 as discussed above is present in manifest 304. If no such digital signature is present in manifest 304, then the identifier of software component 300 is not added to the catalog. However if such a digital signature is present in manifest 304, then a check is made that the resource files 302 and/or manifest 304 over which the digital signature was made have not been altered since being digitally signed. This check can include calculating hash values for the resource files 302 to verify that the calculated hash values are the same hash values as are stored in manifest 304. Checking that the manifest 304 over which the digital signature is made has not been altered can be performed in any other variety of well-known manners using public-key cryptography. A check can also be made as to whether an identifier of a publisher of software component 300 is included in manifest 304 matches (e.g., is the same as) a publisher identifier included in the digital signature. If the resource files 302 and/or manifest 304 over which the digital signature was made have been altered since being digitally signed, then the identifier of software component 300 is not added to the catalog.

By way of yet another example, a check can be made as to whether an entity that generated the digital signature over resource files 302 and/or manifest 304 is trusted. This check can be made by accessing a certificate store to determine whether a digital certificate of the entity that generated the digital signature is included in a certificate store of the device on which software component 300 is being installed. Alternatively, rather than being included in the certificate store, a certificate chain from a digital certificate in the certificate store to the digital certificate of the entity that generated the digital signature can be established. If such a digital certificate is not included in the certificate store (or a certificate chain cannot be established), then the identifier of software component 300 is not added to the catalog.

Returning to FIG. 1, once software components 122-128 are installed on computing device 100, paths to the locations of one or more of the resource files of the software components 122-128 can be maintained. These paths can be maintained in catalog 106 or alternatively as metadata in other stores of operating system 102. These paths allow the particular files to be retrieved and executed, loaded, or otherwise used as appropriate. For example, paths to icons to be displayed as shortcuts can be maintained, paths to executable files can be maintained, paths to dynamic link libraries (DLLs) can be maintained, and so forth. By maintaining these paths, information regarding the software components can be readily identified and returned. For example, if a particular software component is to be run, the path to an executable file for the software component can be readily identified. By way of another example, if an icon representing a shortcut to a software component is to be displayed, the file storing the data for the icon can be readily identified. By way of yet another example, if a DLL is to be loaded, the path to the file storing that DLL can be readily identified.

Software component access control module 104 allows various other components and modules to obtain information regarding installed software components from catalog 106. Such other components and modules can be part of operating system 102, or alternatively can be one or more of software components 122-128. Information maintained in catalog 106 regarding the installed software components can be returned to a requesting component or module, or alternatively can be used by control module 104 in generating a response to a request. Catalog 106 can also be leveraged by other components or modules of operating system 102 as catalog 106 maintains a record of the software components installed on computing device 100.

In one or more embodiments, various operations are supported by control module 104 in accessing catalog 106. These operations can be exposed as methods of an application programming interface (API) or alternatively requests for these operations to be performed can be made to control module 104 in other manners. Table I below describes an example of such operations supported by control module 104 in accessing catalog 106.

TABLE I

| Operation | Description |
| --- | --- |
| Enumerate catalogs | Returns a list of catalogs in the operating system. |
| Get catalog | Returns a catalog for an account specified in the request to perform the operation. |
| Add component | Adds a software component to a catalog. |
| Remove component | Removes a software component from a catalog. |
| Enumerate components | Returns a list of the software components in the full index and/or effective index of a catalog. |
| Enumerate components by identity | Returns a list of the software components in the full index and/or effective index of a catalog specified in the request having a software component identifier that matches a specified identity. The specified identity can be partial or full. For example, the specified identity can use wildcards to indicate unspecified attributes or parts of the component identity. |
| Get component by path | Returns a software component identifier from the effective index and/or the full index given a specified catalog and path of a directory or a file. This allows a caller to determine whether a given file belongs to a component in the effective index and/or full index. |

As discussed above, in one or more embodiments the identifier for a software component includes a component identifier that identifies a version number for the software component. In situations where two software components have the same version number, then (assuming the remaining portions of the component identifiers of the two software components are the same) one of the two software components is determined to be a new replacement version of the other. The one of the two software components that is determined to be the new replacement version can be determined in a variety of different manners, such as the one that has the higher version number. Control module 104 replaces the older version of the software component with the new replacement version of the component, resulting in subsequent requests for that software component to have the new replacement version returned. In one or more embodiments, control module 104 adds the new replacement version of the component to the effective index of catalog 106 and removes the older version of the software component from the effective index of catalog 106. Alternatively, control module 104 can determine which of the two versions of the software component is the new replacement version at other times, such as in response to a request for the software component.

Additionally, each software component has a manifest as discussed above. In one or more embodiments, the manifest of each software component also identifies whether the software component relies on other software components for operation. For example, software component 122 may rely on software component 124 also running in the system, and software component 124 may rely on software component 126 also running in the system.

Given this information in the manifests of the software components, control module 104 can readily determine whether a particular software component can run on computing device 100. For example, control module 104 can access the manifest of software component 122 and determine that, in order for software component 122 to run that software component 124 (and thus also software component 126) also be running. Accordingly, control module 104 can respond to queries from other components or modules (which can be part of operating system 102 or alternatively separate from operating system 102) regarding whether a particular software component can run in computing device 100. If the other software components that the particular software component relies on are in catalog 106, then the particular software component can run in computing device 100. However, if the other software components that the particular software component relies on are not in catalog 106, then the particular software component cannot run in computing device 100.

Similarly, given this information in the manifests of the software components, control module 104 can readily determine whether removal of a particular software component from computing device 100 will prevent other software components from running. For example, control module 104 can access the manifest of software component 122 and determine that, in order for software component 122 to run that software component 124 (and thus also software component 126) also be running. Accordingly, control module 104 can respond to queries from other components or modules (which can be part of operating system 102 or alternatively separate from operating system 102) regarding whether software component 124 can be removed from computing device 100 by indicating that software component 124 cannot be removed without resulting in at least one other software component possibly failing to run properly. The identity of the software component that might fail to run properly can also be included in the response to such a query.

Figure 4:
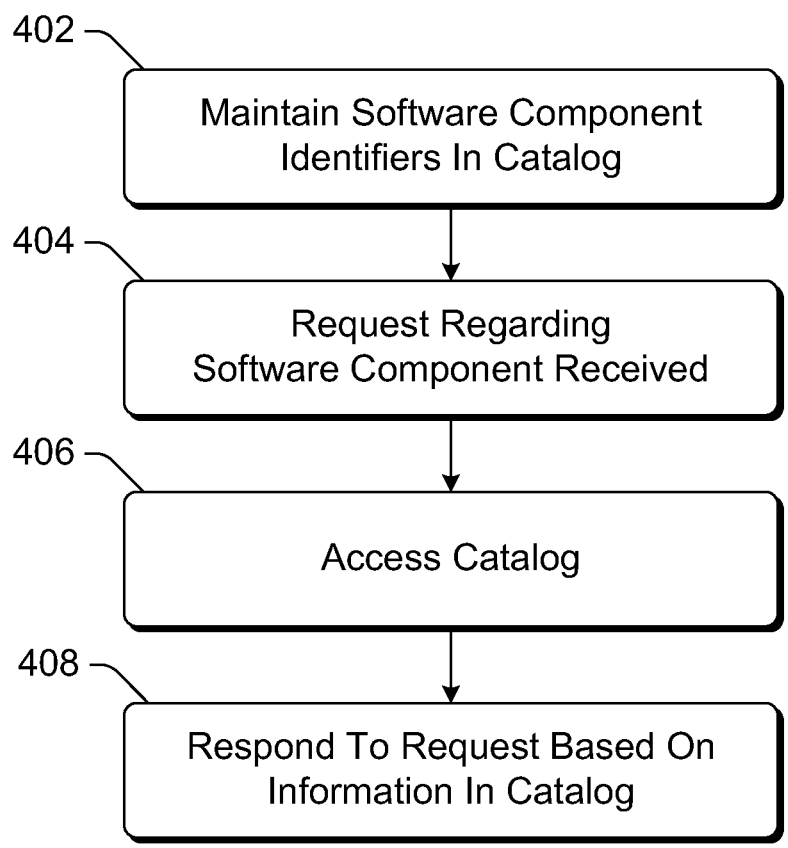
FIG. 4 is a flowchart illustrating an example process for catalog-based software component management in accordance with one or more embodiments.

FIG. 4 is a flowchart illustrating an example process 400 for catalog-based software component management in accordance with one or more embodiments. Process 400 is carried out by a control module of an operating system running on a device, such software component access control module 104 of FIG. 1, and can be implemented in software, firmware, hardware, or combinations thereof. Process 400 is an example process for catalog-based software component management; additional discussions of catalog-based software component management are included herein with reference to different figures.

In process 400, software component identifiers are maintained in a catalog (act 402). These software component identifiers distinguish software components from one another, and can take a variety of different forms as discussed above. Multiple different catalogs can be included on a device, each optionally including different indexes, as discussed above.

Eventually, a request regarding a software component is received (act 404). Process 400 waits until such a request is received, and in response to the request accesses the catalog (act 406). The catalog to be accessed can be identified as part of the request, or alternatively can be inherent in the request (e.g., the catalog of a current user of the computing device implementing process 400).

The request is responded to based on the information in the catalog (act 408). This information in the catalog includes at least the component identifiers, as discussed above. The particular response can vary based on the nature of the requested operation, as discussed above.

Figure 5:
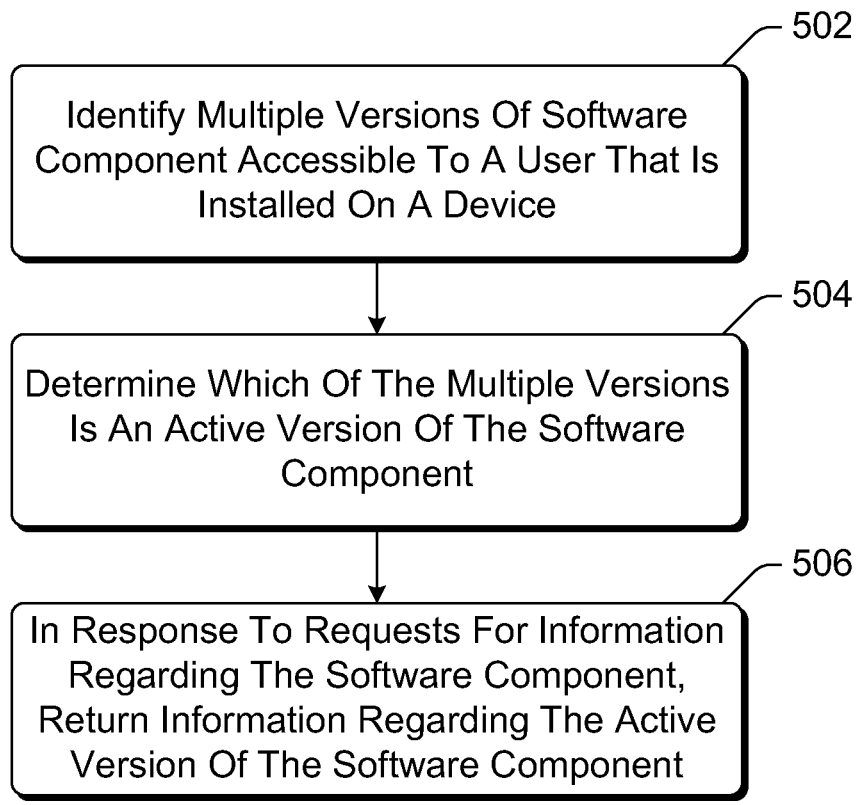
FIG. 5 is a flowchart illustrating an example process for catalog-based software component management in accordance with one or more embodiments.

FIG. 5 is a flowchart illustrating an example process 500 for catalog-based software component management in accordance with one or more embodiments. Process 500 is directed to responding to requests where multiple versions of a software component are installed on a device. Process 500 is carried out by a control module of an operating system running on a device, such software component access control module 104 of FIG. 1, and can be implemented in software, firmware, hardware, or combinations thereof. Process 500 is an example process for catalog-based software component management; additional discussions of catalog-based software component management are included herein with reference to different figures.

In process 500, multiple versions of a software component accessible to a user that is installed on a device are identified (act 502). Different users can have access to different software components, as discussed above.

A determination is made as to which of the multiple versions is an active version of the software component (act 504). This determination can be made when the multiple versions are identified or at other times, and a list of the active versions can be maintained (e.g., as an effective index) as discussed above. Alternatively, this determination can be made in response to a request for information regarding the software component.

In response to requests for information regarding the software component, information regarding the active version of the software component is returned (act 506). Such requests can be requests received from other components or modules of an operating system implementing process 500, or alternatively other software components as discussed above.

Process 500 refers to a single software component. It is to be appreciated that process 500 can be repeated for multiple software components. For example, an effective index of the active versions of multiple software components can be maintained as discussed above.

It should also be noted that the identification performed in act 502 and the determination performed in act 504 can be performed at various times. In one or more embodiments, acts 502 and 504 are performed each time a change is made to the software components installed on computing device 100. A software access control module implementing process 500 can be informed by another component or module of the operating system when such a change is made. Examples of such changes include installing a software component and uninstalling a software component. Alternatively, acts 502 and 504 can be performed at other times, such as in response to a request for information regarding a software component or catalog, during times of low activity (e.g., when the operating system is not busy performing other tasks), and so forth.

Figure 6:
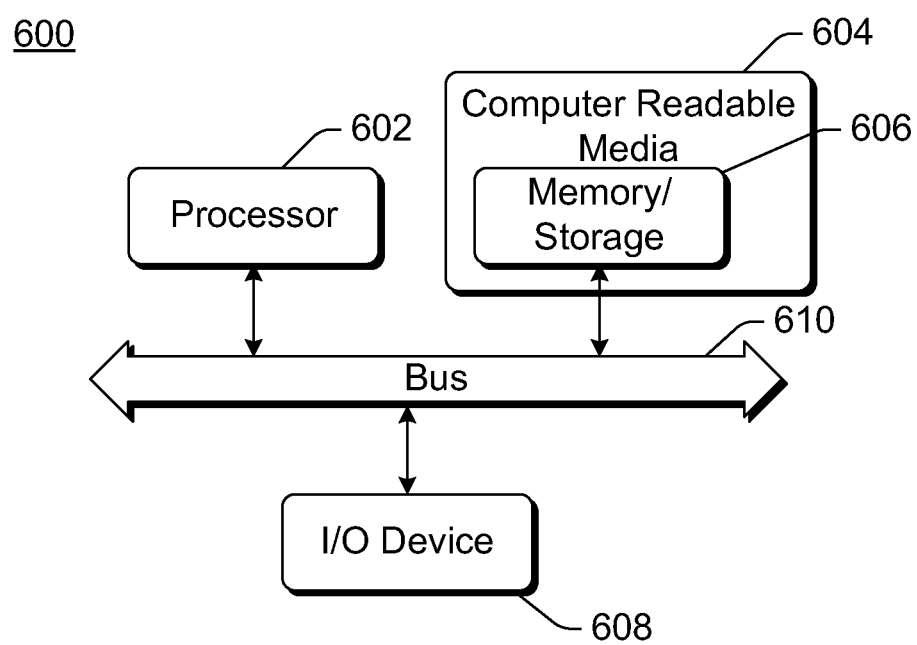
FIG. 6 illustrates an example computing device that can be configured to implement the catalog-based software component management in accordance with one or more embodiments.

FIG. 6 illustrates an example computing device 600 that can be configured to implement the catalog-based software component management in accordance with one or more embodiments. Computing device 600 can be, for example, computing device 100 of FIG. 1.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, although can alternatively also incorporate firmware and/or hardware. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the catalog-based software component management described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage media having stored thereon multiple instructions of an operating system that, when executed by one or more processors of a device, cause the one or more processors to:
    maintain multiple software component identifiers in a catalog of the operating system, wherein multiple software components are installed on the device and each of the multiple software component identifiers corresponds to one of the multiple software components, the catalog of the operating system including a full index and an effective index;
    select, from the full index of the catalog that includes each of the multiple software component identifiers, a version associated with at least one of the multiple software component identifiers to be included in the effective index of the catalog, the selected version being determined, based at least in part on a version identifier;
    access the effective index of the catalog in response to a request regarding one of the multiple software components; and
    respond to the request based at least in part on information included in the effective index of the catalog.

2. One or more computer storage media as recited in claim 1, wherein multiple catalogs are on the device, wherein each of the multiple catalogs corresponds to one of multiple accounts of the operating system, and wherein the instructions further cause the one or more processors to identify one of the multiple catalogs based at least in part on which of the multiple accounts is logged into.

3. One or more computer storage media as recited in claim 1, wherein the request is a request to check whether running the one of the multiple software components depends on one or more other software components being in the catalog.

4. One or more computer storage media as recited in claim 1, wherein two of the multiple software components are different versions of a same software component.

5. One or more computer storage media as recited in claim 1, the effective index including a subset of the full index such that content of the subset is included in both the effective index and the full index.

6. One or more computer storage media as recited in claim 1, wherein each of the multiple software component identifiers includes:
    an identifier of a publisher of the software component;
    a digital signature of the publisher over a manifest storing metadata describing the software component; and
    one or more version numbers of the software component.

7. One or more computer storage media as recited in claim 1, wherein the request is a request regarding a software component having multiple versions installed on the device, and wherein to respond to the request is to respond based at least in part on a particular one of the multiple versions of the software component.

8. One or more computer storage media as recited in claim 1, wherein the request comprises a request for a software component identifier of one of the multiple software components that includes a file having a given path.

9. One or more computer storage media as recited in claim 1, wherein the effective index comprises only a single version for each of the multiple software components.

10. One or more computer storage media as recited in claim 9, wherein the single version for each of the multiple software components is an active version of the respective software component.

11. A method, implemented in an operating system of a computing device, the method comprising:
    identifying two or more versions of a software component that are installed on the computing device;
    maintaining, in a first index of a catalog, software component identifiers of each of the two or more versions of the software component;
    determining which one of the two or more versions of the software component is an active version of the software component to be run;
    in response to the determining, selecting the active version for inclusion in a second index of the catalog; and
    returning, in response to requests for information regarding the software component, information regarding the active version of the software component based, at least in part, on the second index of the catalog.

12. A method as recited in claim 11, the determining comprising:
    identifying, for each of the two or more versions, a version number of the version; and
    selecting, as the active version of the software component, the one of the two or more versions having a highest version number.

13. A method as recited in claim 11, wherein the two or more versions of the software component each have a software component identifier that differs only in a version number.

14. A method as recited in claim 11, each software component identifier including:
    an identifier of a publisher of the version of the software component;
    a digital signature of the publisher over a manifest storing metadata describing the version of the software component; and
    the version number of the version of the software component.

15. A method as recited in claim 11, further comprising:
repeating the identifying, determining, and selecting for each of multiple software components that are installed on the computing device; and
generating the second index that includes an identifier of each of the active versions of the multiple software components.

16. A method as recited in claim 11, the determining comprising:
identifying a set of rules to be used to determine which of two or more versions of a particular software component is the active version of the particular software component, the set of rules including a policy rule set by an administrator of a network to which the computing device is coupled; and
selecting, based on the set of rules, the one of the two or more versions that is the active version of the particular software component.

17. A method as recited in claim 11, further comprising repeating the identifying and determining in response to a new version of the software component being installed on the computing device.

18. A method as recited in claim 11, further comprising repeating the identifying and determining in response to one of the two or more versions of the software component being uninstalled from the computing device.

19. A method as recited in claim 11, further comprising maintaining multiple catalogs each identifying the active version of the software component for a different one of multiple user accounts on the computing device, and wherein the active version of the software component is different versions in different catalogs.

20. A method, implemented by one or more processors of a computing device, the method comprising:
maintaining multiple software component identifiers in a catalog of an operating system, each of the multiple software component identifiers corresponding to one of multiple software components installed on the computing device;
determining, for one or more of the multiple software components, which one of two or more versions of the software component is an active version of the software component, wherein the catalog of the operating system includes both a full index that includes the multiple software component identifiers and an effective index that includes a subset of the multiple software component identifiers, the subset including the active version of each of the one or more of the multiple software components;
accessing the catalog in response to a request regarding one of the multiple software components; and
responding to the request based at least in part on information included in the catalog.

* * * * *